April 5, 1949.  G. H. LOGAN  2,466,454
ILLUMINATED AUTOMOBILE SUN VISOR MIRROR
Filed Jan. 30, 1946  2 Sheets-Sheet 1

Inventor
*George H. Logan*
By *Bernard F. Garvey*
Attorney

April 5, 1949.  G. H. LOGAN  2,466,454
ILLUMINATED AUTOMOBILE SUN VISOR MIRROR
Filed Jan. 30, 1946  2 Sheets-Sheet 2
FIG. 4.
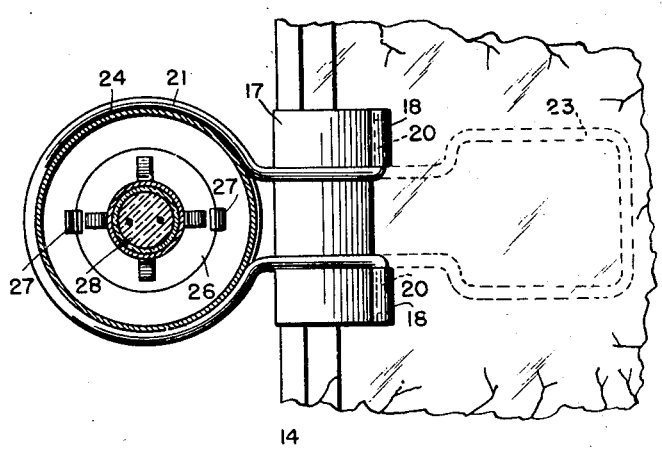
FIG. 6.
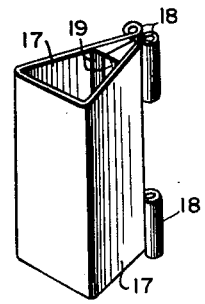
FIG. 3.
FIG. 7.
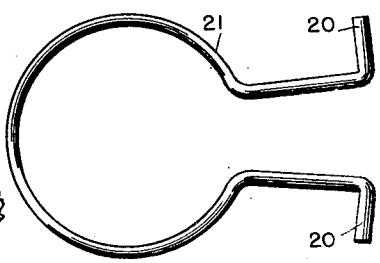
FIG. 8.
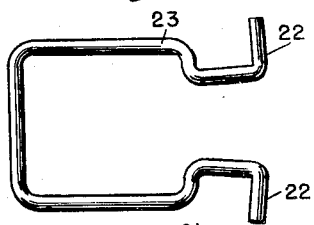
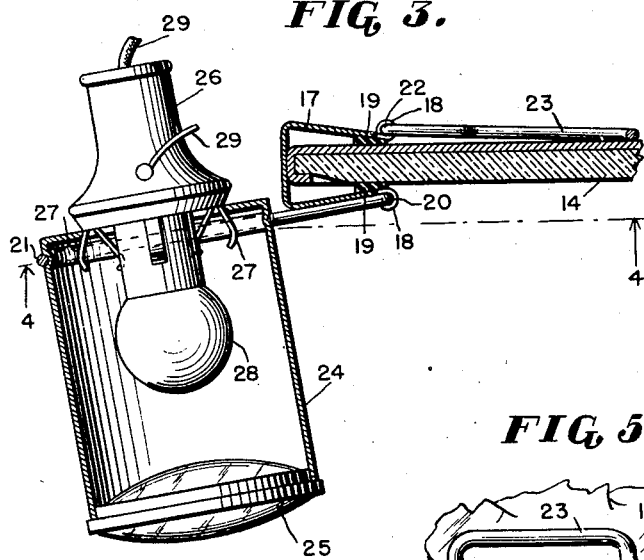
FIG. 5.
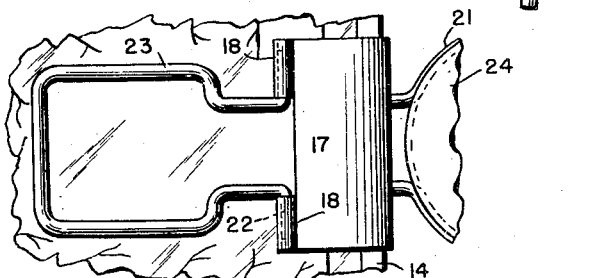
FIG. 9.
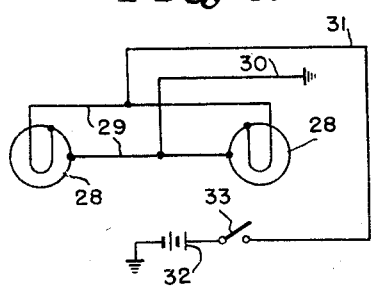
Inventor
George H. Logan
By Bernard F. Garvey
Attorney Patented Apr. 5, 1949

2,466,454

UNITED STATES PATENT OFFICE 2,466,454

ILLUMINATED AUTOMOBILE SUN VISOR MIRROR

George H. Logan, Berkeley, Calif.

Application January 30, 1946, Serial No. 644,377

3 Claims. (Cl. 240—4.2)

It has been found that the usefulness and convenience of the popular vanity mirror, normally attached to the sun visor of an automobile, is enhanced by associating with the mirror proper means of illumination. Consequently, an object of this invention is to provide an illumination unit for automobile vanity mirrors which may be clipped to the sun visor in a manner to illuminate the person using the mirror without necessity for adjustment by the installer or the users of the unit.

Other objects of the invention are to provide an illumination unit embodying a lamp on each end of a mirror to emit cones of light, the lamps being so positioned to intersect the cones at a point remote from the mirror for concentration on the face, neck and head of a person seated alongside the driver, without annoyance to the driver; to provide a unit which, in addition to affording maximum illumination, for toilet adjustment, is also usable to illuminate the back and floor of the automobile by a simple adjustment of the sun visor; to provide a unit, adapted for outboard use, for illuminating road signs and house numbers, and to facilitate tire changing and car repair in general by moving the sun visor on its axis, to a point of vantage; and to provide an inexpensive unit which may be assembled, for the most part, from standard readily obtainable parts, the unit being capable of expeditious engagement with and disengagement from the vanity mirror.

Other objects of the invention will be apparent from the following description of the present preferred forms of the invention, wherein:

Figure 3 is a detail fragmentary sectional view of a vanity mirror showing one of the lamps of the present invention attached thereto, the lamp housing being shown in longitudinal section;

Figure 4 is a detail fragmentary sectional view taken on the line 4—4 of Figure 3 showing the interior of the lamp housing and the manner of attaching the housing to one end of the vanity mirror;

Figure 5 is a rear elevational view of one of the clips with a spreading arm attached thereto, a portion of one of the lamp housing and a portion of the vanity mirror being associated therewith;

Figure 6 is a perspective view of one of the lamp housing supporting clips;

Figure 7 is a plan view of one of the housing supporting arms;

Figure 8 is a plan view of one of the clip spreading arms; and

Figure 9 is a diagrammatical view of the unit including the electric circuit and switch.

Figure 1:
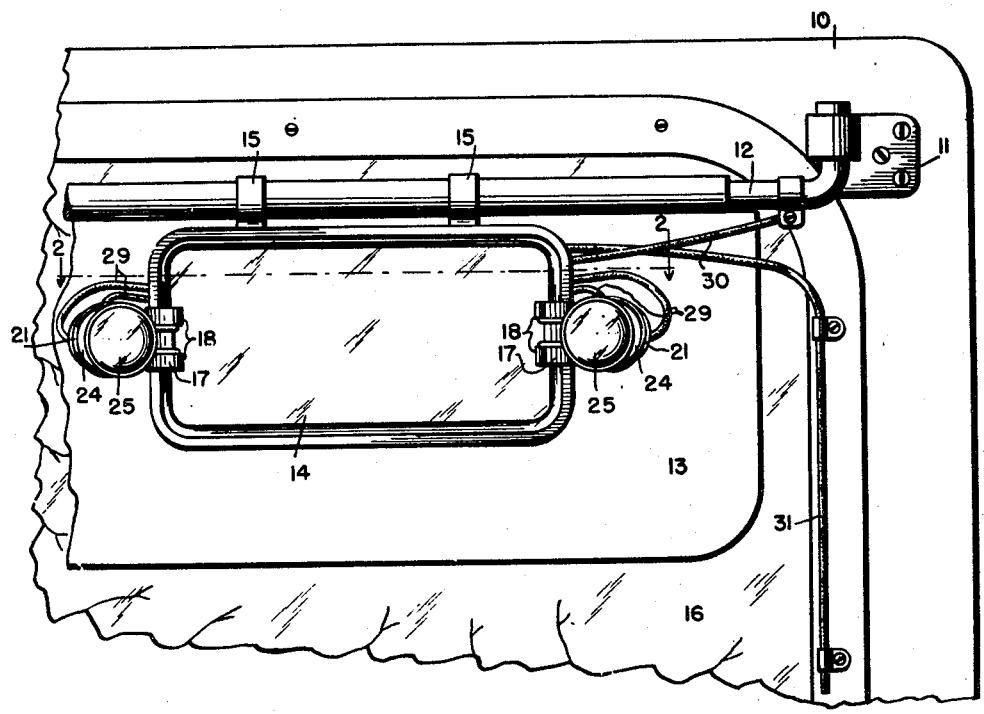
Figure 1 is a front elevational view of an illumination unit for automobile mirrors constructed in accordance with the present invention illustrating its application.

For the purpose of illustrating the application of this invention, I have, in the drawing, shown fragmentarily an automobile windshield frame 10 of standard construction which carries a bearing 11 in which one end of a visor supporting bar 12 is rotatably mounted. Sun visor 13 of conventional design is mounted on the bar 12 and may be adjusted in a manner well known in the art. The visor is equipped with a vanity mirror 14 also of standard construction which is secured to the visor bar by yieldable fingers 15. In Figure 1 of the drawing, the visor 13 pends in parallel relation to the windshield 16.

The unit of the present invention comprises a pair of yieldable clips 17 which are attached to be flexed over the opposite terminals of the mirror 14 as illustrated in Figures 1 to 4 inclusive. Each of the clips in the present instance consists of a metal sheet, bent to provide a body that is substantially wedge shaped (or U-shaped with the ends normally closed), portions of the free margins thereof being rolled outwardly to provide parallelly arranged bearing tubes 18, there being 4 tubes, in the embodiment of the invention illustrated in the drawings, on each clip. Each clip is additionally provided with a pair of rubber pads 19 which are secured to the inner walls of the clips, adjacent their free ends, and are adapted to engage the opposite faces of the mirror 14 as shown to advantage in Figures 2 and 3. The bearing tubes 18 on one wall of the clip are adapted for the reception of the free right angle ends 20 of a lamp housing supporting arm 21. The remaining two bearing tubes, carried by the opposite wall of the clip, are adapted to receive the right angled terminals 22 of a clip spreading arm 23.

Each of the lamp housing supporting arms 21 is adapted to circumscribe and engage a cylindrical lamp housing 24. As shown to advantage in Figure 3, the housing 24 is provided with an annular recess which conforms to the contour of the arm 21 and into which the arm is adapted to be snapped. The lamp housing is equipped at one end with a lens 25 which is preferably made of a translucent molded plastic material. In the preferred form of the invention, a converging lens is employed with proper focal length and space from the bulb filament to create a diverging cone of light for projection on the person of the user of the mirror. The rear end of each of the housings 24 carries a bulb socket 26 which includes resilient snap-in fingers 27. The socket 26 is adapted for the reception of a bulb 28 which is preferably of the bayonet type. The bulbs 28 of the lamps are illuminated by circuit wires 29 one of which may be grounded by a wire 30 to the windshield frame while the other is engaged in circuit, through a wire 31, with a source of energy 32 and a control switch 33.

The clip spreading arms 23 are made of spring wire and function as levers to spread the clip in an obvious manner. By applying force to the outer end of the clip spreading arm in a direction toward the lamp housing, the clip is spread open permitting it to slide over the mirror 14. The clip may then be urged into position against the back of the mirror 14 as illustrated in Figure 3.

When it is desired to replace a bulb 28 the lamp housing 24 may be moved inwardly toward the mirror 14 making the rear end of the lamp housing readily accessible, as is apparent from the dotted line position of the lamp in Figure 1.

Figure 2:
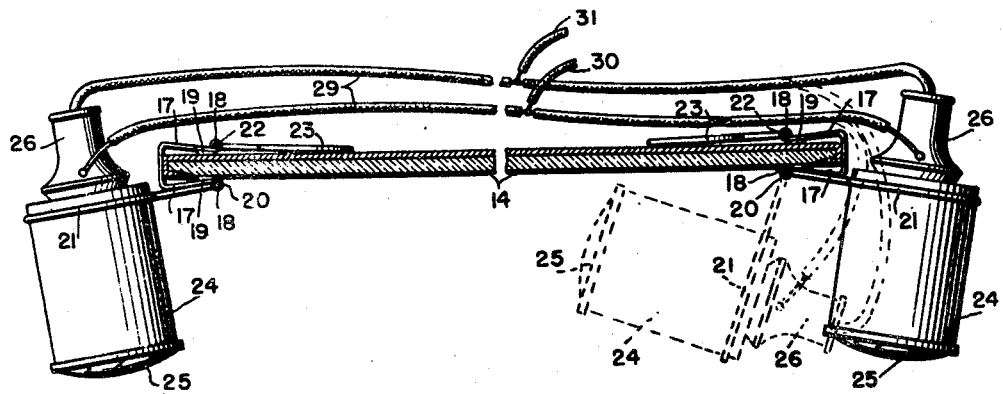
Figure 2 is a horizontal sectional view of the same taken on the line 2—2 of Figure 1 looking in the direction of the arrows.

In the use of the invention, it is apparent that when the lamp housings are clipped to the mirror, as shown advantageously in Figures 2 and 3, the light emitting ends of the lamps converge inwardly to project, in part, over the mirror at the opposite ends of the latter. In view of the fact that each of the illuminating agents herein shown and described is designed to produce a specular cone of light, the cone, diverging as it leaves the lens, produces a circle of light, of predetermined diameter, which impinges the face of a passenger in the front seat alongside the driver. The person using the mirror is seated directly in front of the mirror and the face is on the central normal axis of the mirror. Consequently, the axis of the cone of light emitted by the illuminating agent is caused to intersect the normal axis of the mirror at a point which will be the average distance of a passenger's face from the mirror resulting in effective illumination.

Although in the preferred form of the invention herein shown and described, a pair of lamps are used, it is to be understood that good results may also be obtained through the use of a single lamp properly adjusted so as to illuminate the face of the user of the mirror. Obviously, where an angle light is employed, the same mode of operation is resorted to whether the combination light and mirror is being used inside or outside of the automobile. In every instance, the light or lights and mirror move as a unit with the sun visor.

Various changes may be made in the invention within the scope of the claims hereto appended.

What I claim is:

1. An illumination unit for automobile mirrors, including a pair of illuminating agents adapted for engagement with the terminals of an automobile mirror, each agent comprising an elongated lamp housing and converging lens, the axes of the lamp housings being converged to produce converging beams of light passing in front of the mirror, and means engaged to each agent and the mirror, to support the agent on the mirror at the desired angularity for effecting intersection of the light beams.

2. In combination with a movable automobile sun visor and attached vanity mirror, illuminating means for attachment to the edges of the mirror comprising substantially wedge-shaped spring metal clips, clip-opening arms pivotally secured to the sides of the clips, and light housings fastened to a clip-opening arm of each clip.

3. An illumination unit for attachment to the edge of a mirror comprising a substantially U-shaped spring metal clip the ends of which are normally closed, spring wire clip-opening arms pivotally engaged with said closed ends of the clips, and a lamp housing, one of the clip-opening arms being operative to circumscribe and clamp the lamp housing when the arm is engaged with the clip.

GEORGE H. LOGAN.

REFERENCES CITED

The following references are of record in the file of this patent:

UNITED STATES PATENTS

| Number | Name | Date |
|---|---|---|
| D. 135,201 | Grady | Mar. 9, 1943 |
| 691,071 | Philbrook | Jan. 14, 1902 |
| 1,078,445 | Levi et al. | Nov. 11, 1913 |
| 1,139,627 | Baltzley | May 18, 1915 |
| 1,856,948 | Dolamore | May 3, 1932 |
| 2,088,812 | Reichenbach | Aug. 3, 1937 |
| 2,123,319 | Thompson | July 12, 1938 |
| 2,205,279 | Wesson | June 18, 1940 |
| 2,224,259 | Florman | Dec. 10, 1940 |
| 2,235,109 | Morey | Mar. 18, 1941 |

FOREIGN PATENTS

| Number | Country | Date |
|---|---|---|
| 21,092.29 | Australia | July 9, 1930 |